United States Patent
Aharoni et al.

(10) Patent No.: US 11,087,242 B2
(45) Date of Patent: Aug. 10, 2021

(54) APPLICATION OF SPATIAL DIMENSION TO CRUISE SEARCH AND CABIN SELECTION

(75) Inventors: Amit Aharoni, San Francisco, CA (US); Nicolas Meunier, San Francisco, CA (US)

(73) Assignee: The Independent Traveler, Inc., Newton, MA (US)

( * ) Notice: Subject to any disclaimer, the term of this patent is extended or adjusted under 35 U.S.C. 154(b) by 32 days.

(21) Appl. No.: 13/345,639

(22) Filed: Jan. 6, 2012

(65) Prior Publication Data
US 2012/0179498 A1 Jul. 12, 2012

Related U.S. Application Data

(60) Provisional application No. 61/430,884, filed on Jan. 7, 2011, provisional application No. 61/437,438, filed on Jan. 28, 2011.

(51) Int. Cl.
*G06Q 10/02* (2012.01)

(52) U.S. Cl.
CPC .................. *G06Q 10/02* (2013.01)

(58) Field of Classification Search
CPC ...... G06Q 10/02; G06Q 10/025; G06Q 50/12; G06Q 50/14
USPC ....................................... 705/5–6
See application file for complete search history.

(56) References Cited

U.S. PATENT DOCUMENTS

| | | | |
|---|---|---|---|
| 4,788,643 A | 11/1988 | Trippe et al. | |
| 5,948,040 A | 9/1999 | DeLorme et al. | |
| 2002/0065691 A1* | 5/2002 | Twig | G06Q 10/025 |
| 2002/0082879 A1* | 6/2002 | Miller | G06Q 10/02 705/5 |
| 2002/0099576 A1 | 7/2002 | MacDonald et al. | |
| 2003/0004760 A1 | 1/2003 | Schiff et al. | |
| 2003/0187705 A1* | 10/2003 | Schiff et al. | 705/5 |
| 2006/0059024 A1* | 3/2006 | Bailey | G06Q 10/025 705/5 |
| 2008/0040167 A1* | 2/2008 | Ackerman | G06Q 10/02 705/5 |
| 2008/0201227 A1 | 8/2008 | Bakewell et al. | |
| 2008/0255889 A1* | 10/2008 | Geisler et al. | 705/5 |
| 2008/0281644 A1* | 11/2008 | Payne | G06Q 10/02 705/5 |
| 2009/0030748 A1 | 1/2009 | Halavais et al. | |
| 2009/0138291 A1* | 5/2009 | Heinze | 705/5 |
| 2009/0182590 A1 | 7/2009 | Ashby et al. | |

(Continued)

OTHER PUBLICATIONS

Chaffin, Full Page Overlay Window, CreativeCOW Web Design Tutorial, WebArchive copy dated Oct. 2008.*

(Continued)

*Primary Examiner* — Daniel Vetter
(74) *Attorney, Agent, or Firm* — Haverstock & Owens LLP

(57) ABSTRACT

A user interface that improves the cruise line itinerary research and selection process by integrating an interactive geographical display that is able to display multiple cruise line itineraries thereby reducing the number of page reloads during the user interaction with the user interface. Further, the user interface improves the cruise line cabin selection process by integrating spatial dimension data into cabin search results across cabin types and/or categories.

20 Claims, 10 Drawing Sheets

(56) References Cited

U.S. PATENT DOCUMENTS

| | | | | |
|---|---|---|---|---|
| 2009/0228818 | A1* | 9/2009 | Hebard | G06F 17/212 |
| | | | | 715/768 |
| 2009/0256839 | A1* | 10/2009 | Bastian | 705/5 |
| 2010/0010840 | A1* | 1/2010 | Eden | 705/5 |
| 2010/0306075 | A1 | 12/2010 | Drance et al. | |
| 2011/0007076 | A1* | 1/2011 | Nielsen | G06F 17/30241 |
| | | | | 726/30 |
| 2011/0251787 | A1* | 10/2011 | Gupta et al. | 701/201 |
| 2011/0306400 | A1* | 12/2011 | Nguyen | G07F 17/3218 |
| | | | | 463/20 |
| 2012/0010995 | A1* | 1/2012 | Skirpa | G06F 3/0481 |
| | | | | 705/14.49 |
| 2012/0078667 | A1* | 3/2012 | Denker et al. | 705/5 |
| 2012/0101859 | A1* | 4/2012 | Boulton et al. | 705/5 |

OTHER PUBLICATIONS

MapServer: Style, available at http://mapserver.org/mapfile/style.html, WebArchive copy dated Dec. 3, 2009, pp. 1-3.*

Buffington, Seeing Through Your Transparency Problem, The Official Microsoft Expression Design Support Team Blog, Sep. 2008.*

Soler, Booking Simulator Portage to AJAX, Software engineering and Information Systems Thesis, Sophia Antipolis, France, Jul. 2008 (Year: 2008).*

"The New Carnival Breeze: Your port-all to Europe!", 2012 European Cruise Vacations, The Carnival Brochure.

Celebrity X Cruises, celebritycruises.com.au, Oct. 2012-Apr. 2014, Royal Caribbean Brochure.

* cited by examiner

APPLICATION OF SPATIAL DIMENSION TO CRUISE SEARCH AND CABIN SELECTION

RELATED APPLICATIONS

The present application claims priority to U.S. Provisional Patent App. No. 61/430,884, entitled APPLICATION OF SPATIAL DIMENSION TO CRUISE SEARCH AND CABIN SELECTION, and filed Jan. 7, 2011 and also to U.S. Provisional Patent App. No. 61/437,438, entitled APPLICATION OF SPATIAL DIMENSION TO CRUISE SEARCH AND CABIN SELECTION, and filed Jan. 28, 2011, both of which are incorporated herein by reference.

FIELD OF THE INVENTION

The present invention is in the technical field of e-commerce. More particularly, the present invention is in the technical field of travel e-commerce. More particularly, the present invention is in the technical field of cruise e-commerce.

BACKGROUND OF THE INVENTION

The share of cruise booking online in the U.S. is low relative to other categories in the travel space such as Air Travel, Car Rental, and Hotel Bookings, according to a Forrester Research report from January 2009. Cruise e-commerce websites typically follow a sequential booking process. The typical sequence takes customers through: itinerary research (including research on embarkation ports, ports visited, types of ships, ship amenities, etc), itinerary selection (including route selection and date selection), cabin selection, and booking Itinerary Research and Selection The search process usually involves narrowing down the available result set by filtering across dimensions that define a cruise. Rich information is then usually displayed to describe the cruise upon user selection. This process makes it difficult to compare two cruise itineraries from a geographical standpoint as it requires selecting a cruise before viewing its itinerary. In other words, a customer must dive deep into the booking process in order to get geographical information that they would like to compare across cruises.

Cabin Selection

The cabin selection process usually involves a multi-step process: information display on categories, category selection, information display on available cabins for the selected category, and cabin selection. This process makes it difficult to compare cruise cabins as it requires selecting a category before viewing its associated cabins. It is especially difficult to compare the location of two cabins of different categories in order to see where they are relative to one another and relative to the cruise ship's public areas. Given that large cruise ships typically have dozens of categories, the number of cabins covered by a category selection is relatively small and sites typically make it difficult to navigate to other cabins in different categories. The result is that customers can compare only a small portion of the cabins to each other. Moreover, some customers needs are unmet with the current state of information display. For instance, a family booking several proximate cabins of different categories on the same deck would find it nearly impossible to do so online.

SUMMARY OF THE INVENTION

A user interface that improves a) the itinerary research and selection process by integrating an interactive geographical display and reducing the number of page reloads ("post backs") during the user interaction with the user interface and b) improves the cabin selection process by integrating the spatial dimension into cabin search across cabin types and/or categories.

In accordance with a first aspect, the present application relates to a cruise line reservation user interface stored on a non-transitory computer-readable medium. The user interface comprises a list of one or more cruise itineraries and an interactive map including geographical data associated with the one or more itineraries, wherein the list and the interactive map are concurrently displayed to a user on a webpage when accessing the user interface. In some embodiments, geographical data associated with one of the itineraries is displayed on the interactive map when the user selects the associated itinerary from the list of itineraries. In some embodiments, the user is able to select the associated itinerary by hovering over the associated itinerary on the list with a selection icon. In some embodiments, the geographical data associated with each of the itineraries is able to be selectively displayed on the interactive map without navigating to another webpage. In some embodiments, the geographical data comprises a cruise path corresponding to the associated itinerary and one or more ports along the cruise path. In some embodiments, the user interface displays on the webpage port data associated with one of the ports when the port is selected by the user. In some embodiments, the user is able to select the port by hovering over the port on the interactive map with a selection icon. In some embodiments, the user is able to filter the list of itineraries by port such that only itineraries with cruise paths that intersect the selected one or more ports are shown in the list. In some embodiments, the user is able to filter the list of itineraries by port by hovering over the port on the interactive map with a selection icon.

A second aspect of the present application is directed to a cruise line reservation user interface stored on a non-transitory computer-readable medium. The user interface comprises a list of one or more cabins and an interactive deck map having one or more interactive deck plans that illustrate the one or more cabins on each deck, wherein the list and the interactive deck map are concurrently displayed to a user on a webpage when accessing the user interface. In some embodiments, the deck plan associated with each of the cabins within the list is able to be selectively displayed on the interactive deck map without navigating to another webpage. In some embodiments, the user is able to select the associated deck plan by hovering over the associated deck plan on the list with a selection icon. In some embodiments, two or more of the deck plans are displayed simultaneously to the user within the deck map. In some embodiments, the simultaneously displayed deck plans are displayed three-dimensionally such that the deck plans are positioned on top of one another. In some embodiments, spatial relationship data associated with one of the cabins is displayed on the interactive deck map when the user selects the associated cabin from the list of cabins. In some embodiments, when the user selects a cabin from the list of cabins, some or all of the other cabins displayed within the interactive deck map are highlighted if the other cabins share one or more characteristics with the selected cabin. In some embodiments, the user is able to select a cabin by hovering over the cabin on the list or the cabin on the interactive deck map with a selection icon. In some embodiments, the spatial relationship data comprises distances and/or directions between the associated cabin and other cabins or public areas within the deck plans. In some embodiments, the user interface further comprises a virtual shopping cart that is concurrently displayed with the interactive deck map and list, wherein without navigating to another webpage the user is able to save one or more cabins within the virtual shopping cart by selecting and inserting the cabins into the virtual shopping cart on the webpage. In some embodiments, the user is able to filter the list of cabins by proximity such that only cabins with locations within a specified distance of a selected cabin are shown in the list. In some embodiments, each of the deck plans show all the cabins located on that deck when displayed on the interactive deck map. In some embodiments, Another aspect of the present application is directed to a method of implementing a cruise line reservation user interface, the method comprises concurrently displaying to a user on a webpage a list of one or more cruise itineraries and an interactive map including geographical data associated with the one or more itineraries. In some embodiments, the method further comprises displaying geographical data associated with one of the itineraries on the interactive map when the user selects the associated itinerary from the list of itineraries. In some embodiments, the method further comprises hovering over the associated itinerary on the list with a selection icon to select the associated itinerary. In some embodiments, the geographical data associated with each of the itineraries is able to be selectively displayed on the interactive map without navigating to another webpage. In some embodiments, the geographical data comprises a cruise path corresponding to the associated itinerary and one or more ports along the cruise path. In some embodiments, the method further comprises displaying on the webpage port data associated with one of the ports when the port is selected by the user. In some embodiments, the method further comprises selecting the port by hovering over the port on the interactive map with a selection icon. In some embodiments, the method further comprises filtering the list of itineraries by port such that only itineraries with cruise paths that intersect the selected one or more ports are shown in the list. In some embodiments, the method further comprises selecting a port by hovering over the port on the interactive map with a selection icon in order to filter the list of itineraries by port.

Yet another aspect of the present application is directed to a method of implementing a cruise line reservation user interface, the method comprises concurrently displaying to a user on a webpage a list of one or more cabins and an interactive deck map having one or more interactive deck plans that illustrate the one or more cabins on each deck. In some embodiments, the method further comprises selectively displaying on the interactive deck map the deck plan associated with each of the cabins within the list without navigating to another webpage. In some embodiments, the method further comprises selecting the associated deck plan by hovering over the associated deck plan on the list with a selection icon. In some embodiments, the method further comprises simultaneously displaying two or more of the deck plans to the user within the deck map. In some embodiments, the simultaneously displayed deck plans are displayed three-dimensionally such that the deck plans are positioned on top of one another. In some embodiments, the method further comprises displaying spatial relationship data associated with one of the cabins on the interactive deck map when the user selects the associated cabin from the list of cabins. In some embodiments, the method further comprises, when the user selects a cabin from the list of cabins, highlighting some or all of the other cabins displayed within the interactive deck map if the other cabins share one or more characteristics with the selected cabin. In some embodiments, the method further comprises selecting a cabin by hovering over the cabin on the list or the cabin on the interactive deck map with a selection icon. In some embodiments, the spatial relationship data comprises distances and/or directions between the associated cabin and other cabins or public areas within the deck plans. In some embodiments, the method further comprises concurrently displaying a virtual shopping cart with the interactive deck map and list, wherein without navigating to another webpage the user is able to save one or more cabins within the virtual shopping cart by selecting and inserting the cabins into the virtual shopping cart on the webpage. In some embodiments, the method further comprises filtering the list of cabins by proximity such that only cabins with locations within a specified distance of a selected cabin are shown in the list. In some embodiments, each of the deck plans show all the cabins located on that deck when displayed on the interactive deck map.

DETAILED DESCRIPTION OF THE INVENTION

Figure 1:
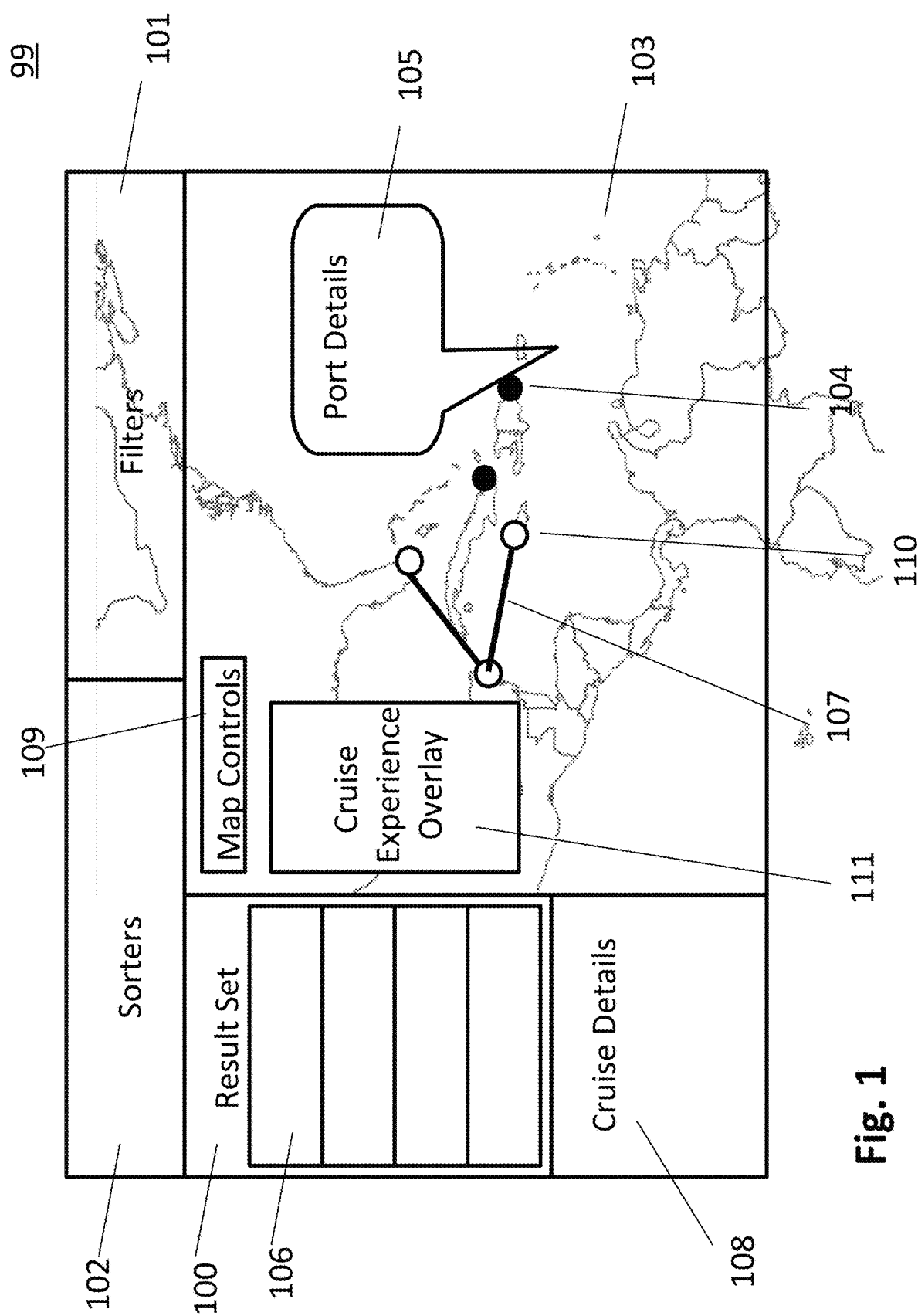
FIG. 1 illustrates an integration of an interactive map in a cruise search web page according to some embodiments.

The system, method and device for application of a spatial dimension to cruise search and cruise cabin selection described herein is directed to a user interface that improves the itinerary research and selection process by integrating an interactive geographical display thereby reducing the number of page reloads necessary during the user interaction with the user interface, and also improves the cabin selection process by integrating the spatial dimension into cabin search across cabin types and categories. As a result, the user interface provides the advantage of enabling users to easily compare itineraries and cabins without navigating between multiple different pages of a website.

Specifically, with regard to the cruise itinerary research and selection process, one embodiment of the user interface comprises the concurrent display of an interactive map on the same web page where the search results are shown such that a user is able to view both the interactive map and the search results simultaneously. In some embodiments, hovering on one of the search results enables the user to quickly view on the interactive map the itinerary associated with that search result. Alternatively, the user interface is able to enable the user to view on the interactive map the itinerary associated with that search result by one or more of hovering over a search result, selecting a search result, or other types of interactions with the user interface that do not require navigation away from the current web page as are well known in the art. Thus, the user interface enables the quick comparison of itineraries by the user without requiring the user to make any clicks and/or to navigate to a different web page or perform other interactions with the user interface. Additionally, in some embodiments, the display of the interactive map by the user interface provides users with the ability to explore the geographic region displayed on the map and receive basic information on ports of call shown on the map without leaving the web page by hovering over, clicking on, and/or other ways of selecting the ports of call without navigating away from the current web page as are well known in the art. Further, the search results are able to be filtered by one or more dimensions and/or characteristics that describe a cruise. In some embodiments, this includes the ability to filter cruises passing through one or more ports by selecting the one or more ports from a filter box and/or from within the interactive map. Alternatively, other types of filters are able to be used as are well known in the art.

With regard to the cabin selection process, one embodiment of the user interface comprises the display to the user of one or more interactive deck plans on the same web page such that prices, cabin availabilities, cabin information, and public area information for each of the deck plans are shown simultaneously. Alternatively, the plans are not shown simultaneously, but are able to each be selectively displayed (e.g. via hovering and/or other selection methods) without requiring the user to navigate to another web page. In some embodiments, each of the interactive deck plans enable multi-zoom levels that enable the user to select/focus on an area of interest and explore different cabins and public areas by clicking on or otherwise selecting them. Upon the selection of the area/element of interest on the displayed deck plan, area/element information is able to be displayed that directly describes or otherwise corresponds to the area/element clicked and/or selected. In some embodiments, the area/element information is able to comprise spatial context data, such as the distance of the area/element (e.g. cabin) from certain public areas or other areas/elements displayed on the deck plan or other deck plans. In some embodiments, hovering or otherwise selecting one or more of the cabins by the user causes the user interface to visually mark some or all cabins of the same category (e.g. size, price), to provide immediate spatial orientation data (e.g. distance, direction and deck level) on some or all cabins of the same category, and/or provide other information corresponding to the selected cabin. In some embodiments, the hovering or otherwise selecting of the one or more cabins and subsequent actions of the user interface are all performed without clicking and/or navigating away from the current web page. In some embodiments, unavailable cabins for a certain date are visually marked as unavailable within the deck plan. In some embodiments, the interactive deck plans show cabins of all types and categories as well as all public areas. In some embodiments, the user interface comprises an ability to add to a virtual shopping cart various cabins of different types and/or categories without leaving the current web page. In some embodiments, the user interface also describes an ability to find cabins which match (or filter out cabins that do not match) specific use cases, such as connected/adjacent cabins or proximate cabins from different types and/or categories (e.g. price ranges, sizes) on a certain deck.

Figure 2:
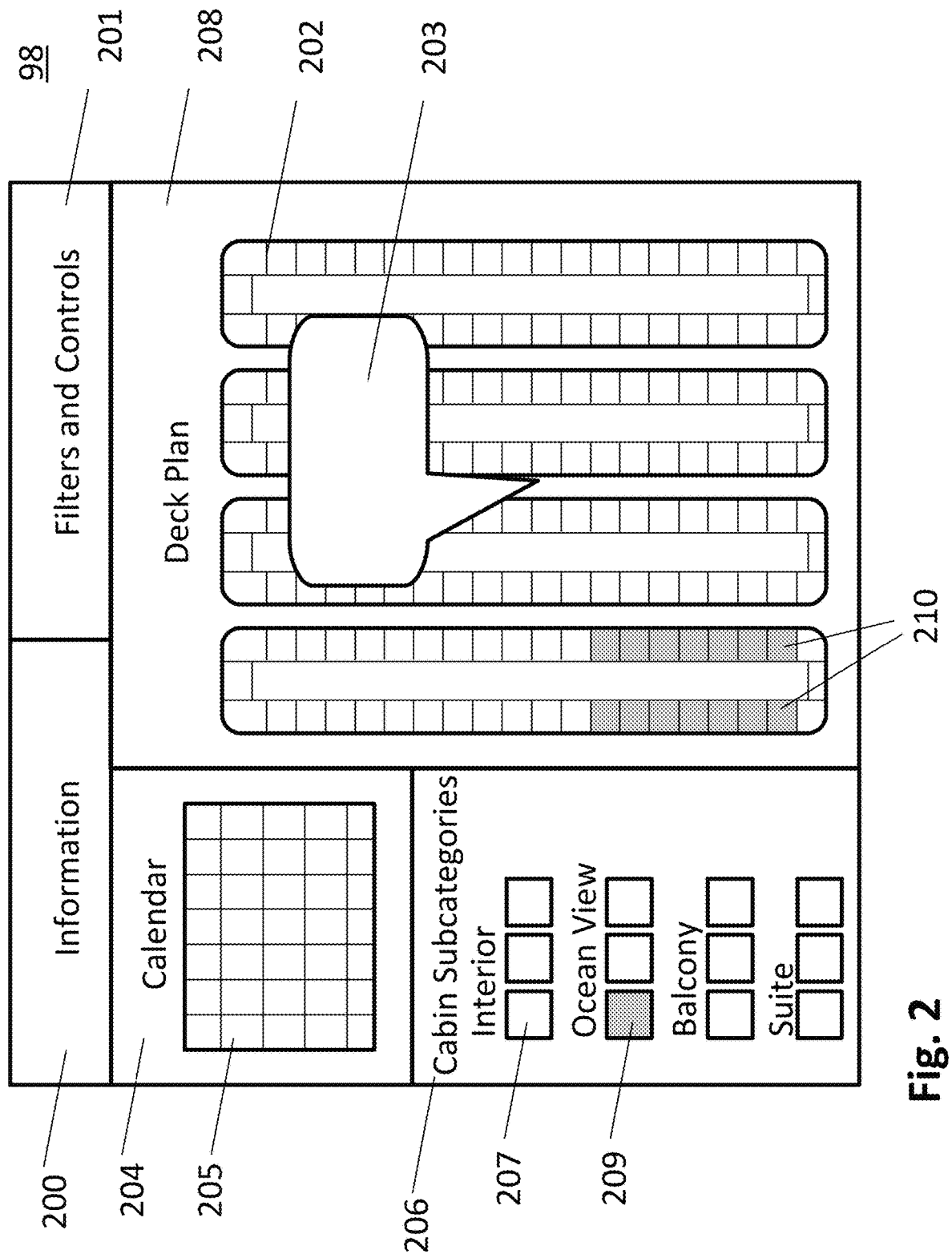
FIG. 2 illustrates an integration of an interactive deck plan in a cabin selection webpage according to some embodiments.
Figure 4:
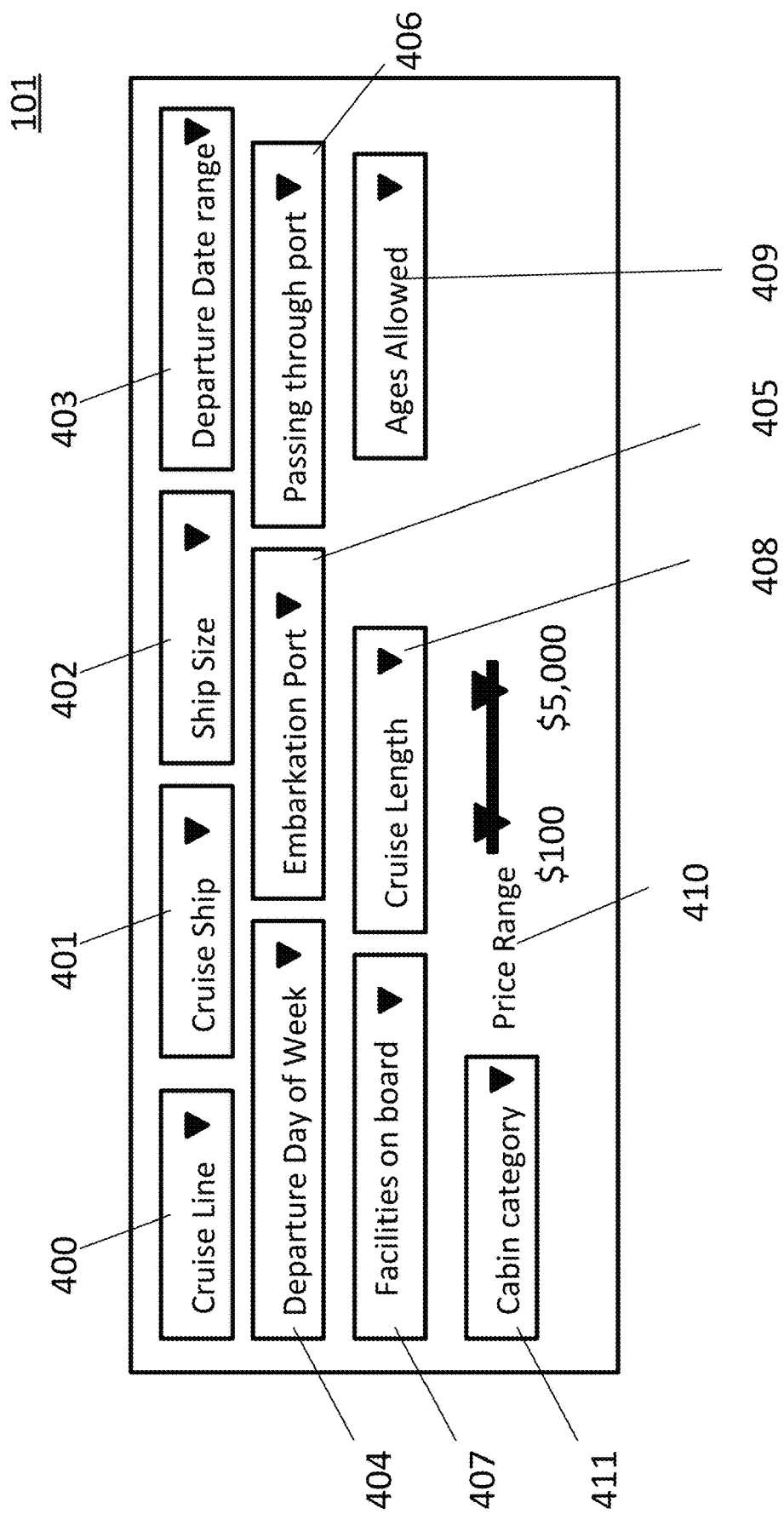
FIG. 4 illustrates a filter area in a cruise search webpage according to some embodiments.
Figure 5:
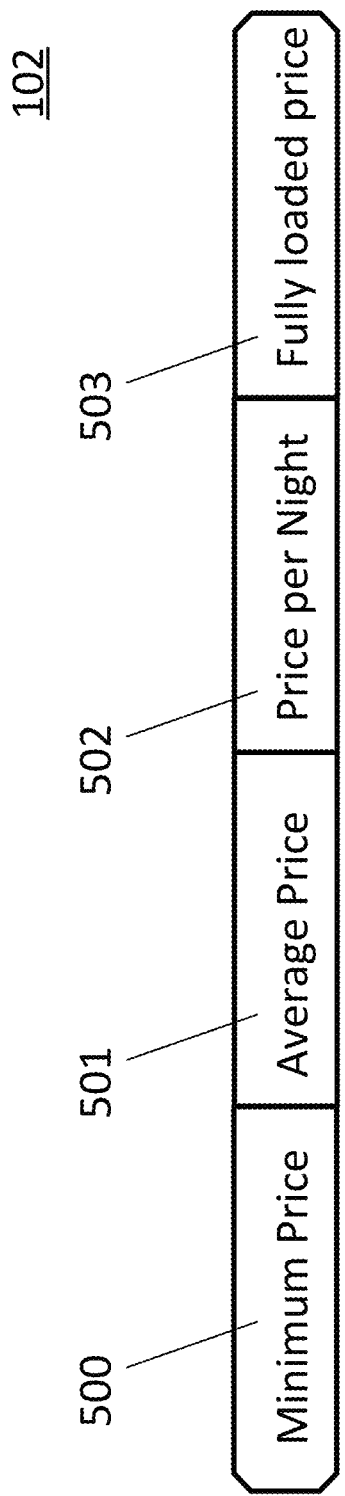
FIG. 5 illustrates a sorter area in a cruise search webpage according to some embodiments.
Figure 6:
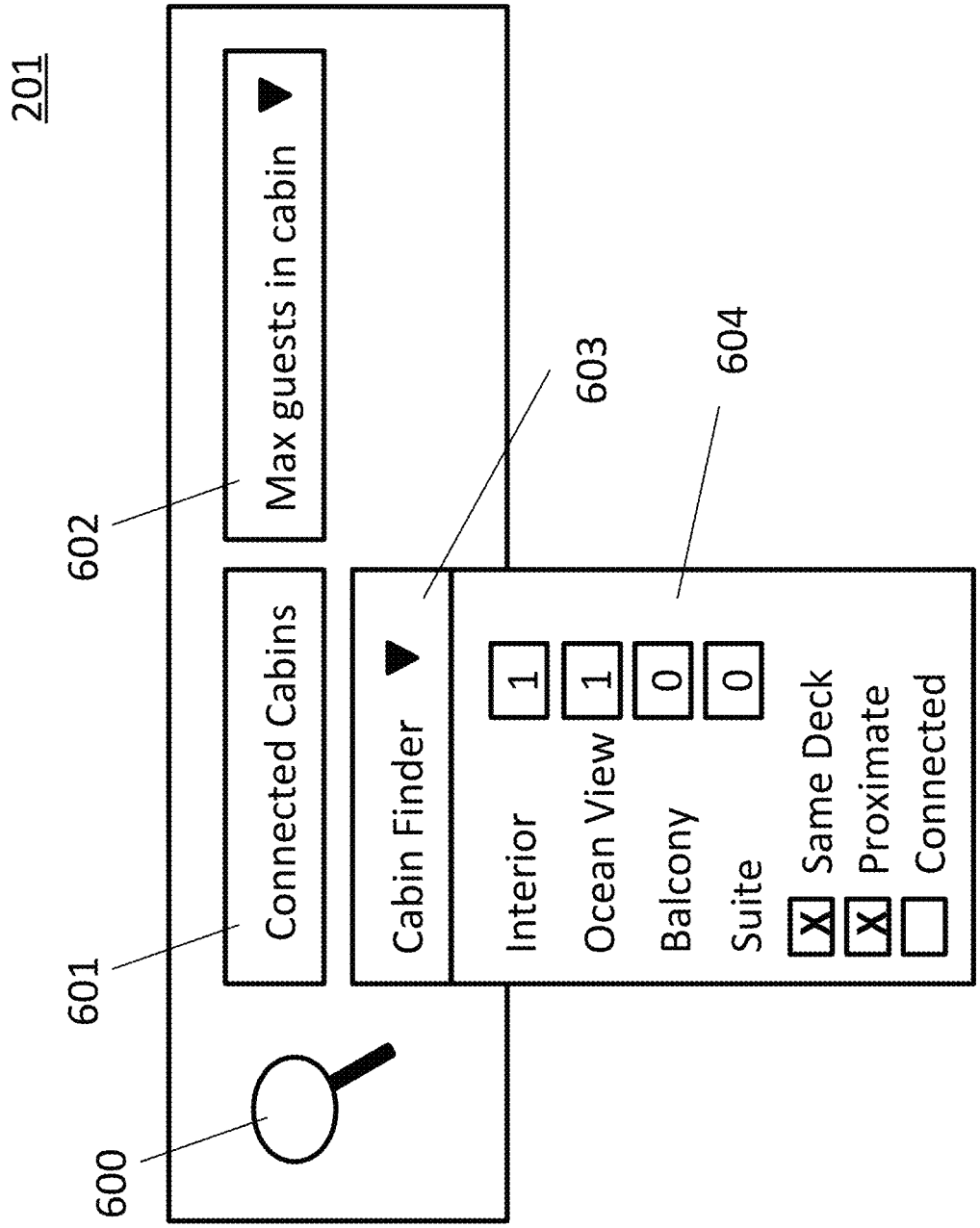
FIG. 6 illustrates a filter and control area in a cabin selection webpage according to some embodiments.

As shown in FIGS. 1-10, the user interface (98, 99) is able to comprise a plurality of web pages that enable a user to search for and select all aspects of a cruise. In particular, FIG. 1, FIG. 3, FIG. 4, FIG. 5, FIG. 7 and FIG. 10, illustrate different aspects of the user interface for the cruise search webpage (99) according to some embodiments. Similarly, FIG. 2 and FIG. 6 illustrate different aspects of the user interface for the cabin selection webpage (98) according to some embodiments. The user interface (98, 99) is able to be generated by one or more servers coupled to a network. Alternatively, the user interface (98, 99) is able to be generated on one or more other computing devices as are well known in the art. In some embodiments, the user interfaces (99, 98) comprise code or non-transient computer readable media stored on the one or more servers or other computing devices. Additionally, it is understood that the specific methods in which user interfaces for cruise search web pages and cabin selection web pages are implemented on one or more computing devices are well known in the art and have been omitted for the sake of brevity.

Itinerary Research and Selection

FIG. 1 illustrates an integration of an interactive map (103) in a cruise search web page (99) according to some embodiments. Specifically, as shown in FIG. 1 the cruise search web page (99) comprises a results set (100) including one or more cruise results (106), one or more filters (101), one or more sorters (102), an interactive map (103), one or more map display icons (104), a port display bubble (105) for one or more of the display icons (104), one or more cruise paths (107), a set of cruise details (108), one or more map controls (109), one or more different display icons (110) and a cruise experience overlay (111). Alternatively, one or more of the above elements are able to be omitted from the page (99) and/or one or more additional elements are able to be added as are well known in the art.

In some embodiments, the result set (100) includes all cruises that match the filters selected (101). In some embodiments, if a large number of cruises are a part of the result set (100), they are able to be paged or scrolled. In some embodiments, the result set (100) comprises a displayed list of cruise results (106) that are the result of applying the AND logical operator between the filters (101) to a set of all available cruises. In some embodiments, the cruise search web page (99) is also able to be configured to show results (100) that are determined by applying the OR operator, or a combination of both AND and OR logical operators between one or more of the filters (101) to a set of all or some of the available cruises. Each cruise result (106) is able to be sorted according to the selected sorter in the sorters section (102) which is described in FIG. 5. Examples of filters (101) are able to include "ages allowed on board," or "Itineraries going through port X" or "Cruises that cost between $X and $Y." Examples of sorters (102) are able to include "sort from lowest to highest price" or "sort by trip length." Alternatively, other types of sorters and/or filters are able to be used as are well known in the art.

Figure 3:
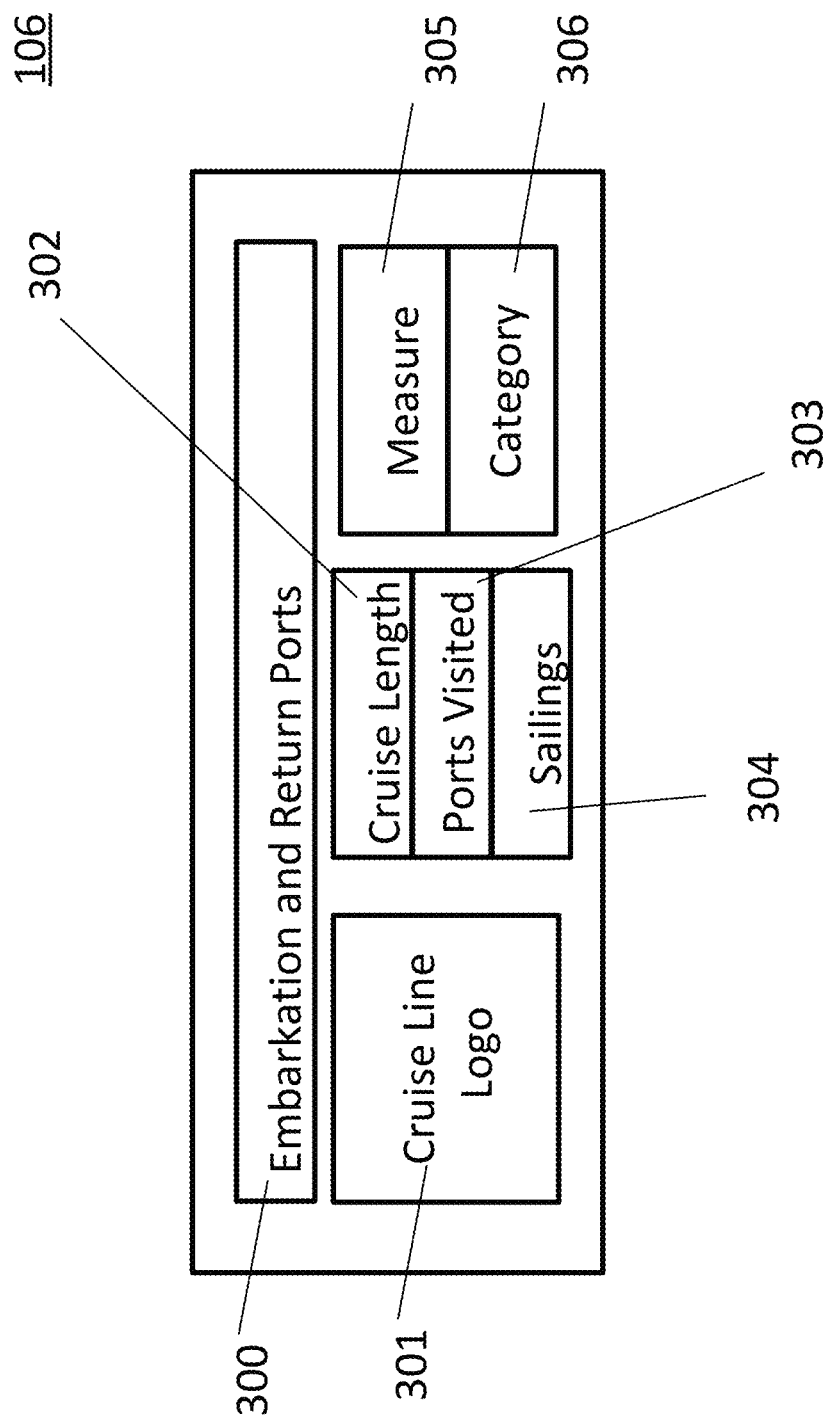
FIG. 3 illustrates a cruise result in a cruise search webpage according to some embodiments.

The information shown in each cruise result (106) is able to be basic information that describes the cruise. FIG. 3 is a magnified view of a single search result (106) according to some embodiments. The information to describe the cruise found within the search result (106) (as shown in FIG. 3) is able to comprise a cruise line (301), a length of the cruise (302), an embarkation and return port (300), and a number of ports visited (303). Alternatively, the information is able to comprise other types of data related to the search result (106) as are well known in the art. In some embodiments, the cruise result (106) is able to aggregate different sailing dates so that each cruise result (106) represents an itinerary for a certain cruise line and cruise ship. In this case, the number of sailings (304) in the selected date range is displayed in the cruise result (106) as shown in FIG. 3. For example, the same 7-day itinerary might leave Miami Saturday afternoon and travel through several ports of call before returning to Miami the following Saturday morning, then turn around and complete the same itinerary again. If someone searched on a period of three weeks, that itinerary could have up to three sailings (304) starting on three different dates. That information is able to be displayed in the search result (106). In some embodiments, the result set (100) is able to be configured to show each sailing as an individual cruise result (106). In the example of the 7-day Miami cruise and a three-week search period, this configuration would return three cruise results (106) in the result set (100) for that cruise. In this configuration, the number of sailings (304) is able to be removed from the cruise result (106) as each cruise result (106) represents one sailing.

In some embodiments, the cruise result (106) also is able to show a difference measure (305) which depends on the selected sorter in the sorters section (102). Different selections in the sorter section (102) will make the results (106) display different measures (305). In some embodiments, the difference measures (305) are able to be prices or price ranges. Alternatively, other difference measures (305) are able to be used as are well known in the art. Typically, a difference measure (305) applies to a certain cabin category (306), and in some embodiments the cabin category (306) is displayed next to the difference measure (305).

FIG. 4 illustrates a magnification of the filters (101) according to some embodiments. Specifically, as shown in FIG. 4, the filters (101) are able to comprise a set of dimensions that define or describe cruises. The filters (101) are able to comprise cruise line (400), cruise ship (401), ship size (402), departure date range (403), departure day of week (404), embarkation port (405), ports the cruise is passing through (406), facilities available on the ship (407), cruise length (408), ages allowed by the cruise line (409), price range (410), and cabin category/subcategory (411). It is understood that more or less filters are able to be displayed as are well known in the art. Some implementations are able to include one or more free text search boxes that allow filtering on one or more dimensions, in conjunction with other filters. Some of the filters (101) are able to contain a list of values from which the user is able to select. For example, the values of the cruise line filter (400) are the names of the available cruise lines. Other filters are able to provide an adjustable range. For example, Departure Date (403) and Price Range (410). Each list filter is able to have single or multiple selections and apply an AND or OR logical operator between its selected values in order to produce the cruise result set (100). Additionally, one skilled in the art will understand that more or less filters (101) and/or filter types are able to be used as are well known in the art.

FIG. 5 illustrates a sorter section (102) comprising one or more sorters (500-503) according to some embodiments. As shown in FIG. 5, the sorters describe the numerical measure (305) which is able to be displayed in each cruise result (106) and which is able to be used to sort the result set (100). Examples of sorters shown in FIG. 5 include minimum price (500), average price (501), price per night (502), and fully loaded price (503). It is understood that more or less sorters are able to be displayed as are well known in the art. In some embodiments, all of the sorters (102) are initially sorted from lowest to highest. Minimum price (500) is able to return the lowest priced cabins from itineraries that fit the filters selected. Average price (501) is able to show an 'average priced' cabin for the category displayed (306) for each itinerary that matches the filters selected (for instance, a median priced cabin in the median category of cabins filtered for). Price per night (502) is able to display the price for an average- or minimum-priced cabin divided by the number of nights at sea. Fully loaded price (503) is able to adjust the "average" price upward by factoring in additional expenses not included in the cruise such as fuel surcharges, drinks, meals off-ship, souvenir purchases, and/or excursions. Additionally, one skilled in the art will understand that more or less sorters (500-503) and/or sorter types are able to be used as are well known in the art.

Filters (101) and sorters (102) are able to work together within the user interface. For example, consider a hypothetical cruise that has only two types of cabins: interior cabins priced less than $999 and Ocean View cabins all priced more than $1000. When a user selects "average price" (501) as the sorter in the sorters section (102) and selects a price of "above $1,000" in the price range filter (410), then the cruise above would be shown with "Ocean View" as the text for (306) and the respective average ocean view price, even if the searcher did not select "Ocean View" only in the filters section.

In some embodiments, changing the filters (101) and/or sorters (102) does not refresh the entire page. Rather, it uses client side technologies such as Javascript for filtering the result set that was sent in advance entirely, or initiates an XHR (AJAX) to the server to request a refreshed set of data. Under an XMLHttpRequest (XHR) scenario, the server receives the entire set of filter values, and builds the result set that is sent to the client by performing the appropriate database query. Indeed, it should be noted that some or all of the actions of the user interface described herein are able to be performed without requiring the user to navigate to another web page using one or more of the above processes.

In some embodiments, the interactive map (103) is integrated with the cruise search webpage in the user interface (99). Specifically, the interactive map (103) is able to allow users to use map controls (109) such as zoom in, zoom out, panning, satellite imagery, street view, photos and webcams available, terrain, to focus on different regions of interest. In some embodiments, the map displays icons (104) over ports of call that exist in the displayed region. Clicking on these icons (104) (or hovering over them in some embodiments) is able to open a port details bubble (105) that shows highlighted information on the port of call. The port details bubble (105) has a button that allows filtering all cruises that pass through that port, effectively changing the "passing through" filter (406). In some embodiments, hovering on any cruise result (106) immediately draws a polygon on the map describing the cruise path (107). In some embodiments, the drawing is able to be achieved by Javascript technology. The ports that are included in the cruise path (107) are marked with a different icon (110). If the user has not clicked on a cruise result, hovering out of the result set area (100) is able to keep the last cruise path (107) on the map which was drawn so that the user can use the map controls (109) to investigate the cruise itinerary. In some embodiments, multiple cruise paths (107) are able to be displayed on the map in different colors. In other words, the user interface 99 allows a user to view multiple itineraries that are dynamically displayed on a single web page upon selection instead of forcing the user to navigate to separate web pages to view a map of a cruise's itinerary.

Figure 10:
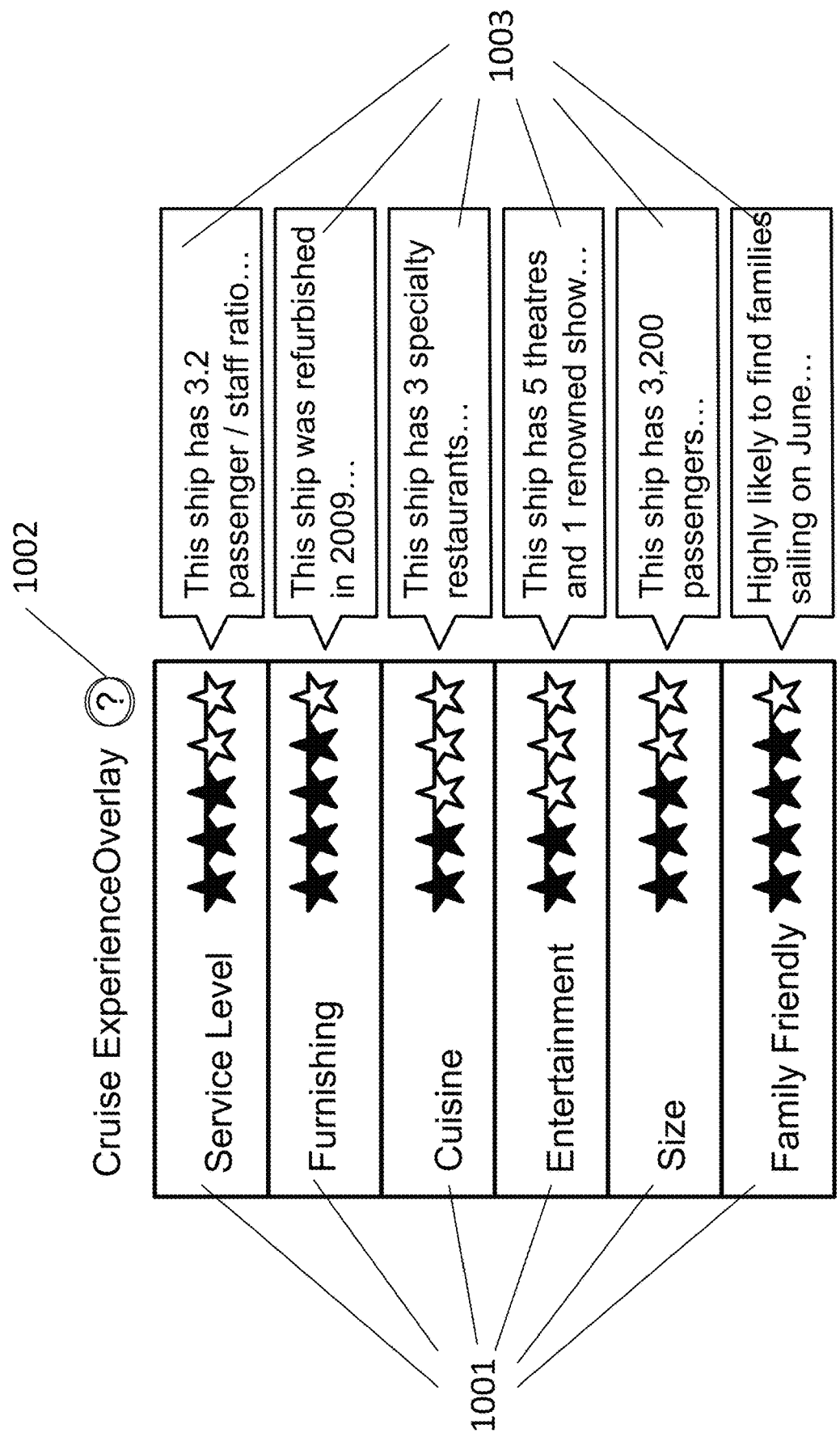
FIG. 10 illustrates a cruise experience overlay according to some embodiments.

FIG. 10 illustrates a magnification of the cruise experience overlay (111) according to some embodiments. In some embodiments, hovering on any cruise result (106) immediately displays a cruise experience overlay (111) that is able to show key dimensions related to the hovered-on result (106). In some embodiments, the display is able to be achieved by JavaScript and HTML technology. As shown in FIG. 10, the cruise experience overlay (111) comprises one or more cruise experience dimensions (1001) related to the cruise experience such as service level, furnishing, cuisine, entertainment, ship size, and family friendliness. Alternatively, one or more of the dimensions (1001) are able to be omitted and/or one or more additional dimensions (1001) are able to be added as are well known in the art. According to some embodiments, each dimension (1001) displays information associated with the selected dimension (1001) in one or more forms of representation such as title, ranking, rating, sliding scale, average of one or more numeric measures, percentile of one or more numeric measures, icons and/or other forms of representation as are well known in the art. In some embodiments, the source for the data representation is able to be factual, editorial, absolute, and/or relative, and/or be based on surveys, user ratings, user rankings, expert ratings, expert rankings, or other sources as are well known in the art. For example, service level is able to comprise a star-rating representing an expert rating, average user rating, percentile of staff-to-passenger ratio relatively to other ships. In some embodiments, service-level is able to comprise the numeric staff-to-passenger measure itself, a comparative measure to other ships, sailings, and/or cruise lines. For example, furnishing is able to comprise displaying a comparative or absolute value of the year the ship was built, the year the ship was last refurbished, a weighted average formula based on both, expert rating and average user rating. Cuisine is able to comprise displaying a comparative or absolute value of the number of dining facilities and specialty restaurants the ship holds, take into account chef or menu ratings, expert rating and average user rating. Entertainment is able to comprise displaying a comparative or absolute value of the number of entertainment facilities such as bars, clubs, and theatres, special shows, expert rating, average user rating. Ship size is able to comprise displaying a comparative or absolute value of the number of passengers, number of cabins, tonnage, and/or other metrics related to ship size. Family friendliness is able to comprise displaying expert rating, average user rating, average demographic data and/or other data related to how many families and passengers below a certain age are typically on board that ship at the month of sailing, for the sailing region, and on the given ship or cruise line. Additionally, other dimensions, types of representations, metrics, and data sources are able to be displayed as are well known in the art. In some embodiments, part or all of the data, metrics, and forms of representation is able to be displayed by hovering or clicking on one of the dimensions (1001) as a tooltip or a popup (1003) displayed in proximity to the dimension (1001) or not. In some embodiments, a general explanation of the methodology used to derive the data, metrics, and forms of representation can be displayed by clicking on a link or a button (1002).

Figure 7:
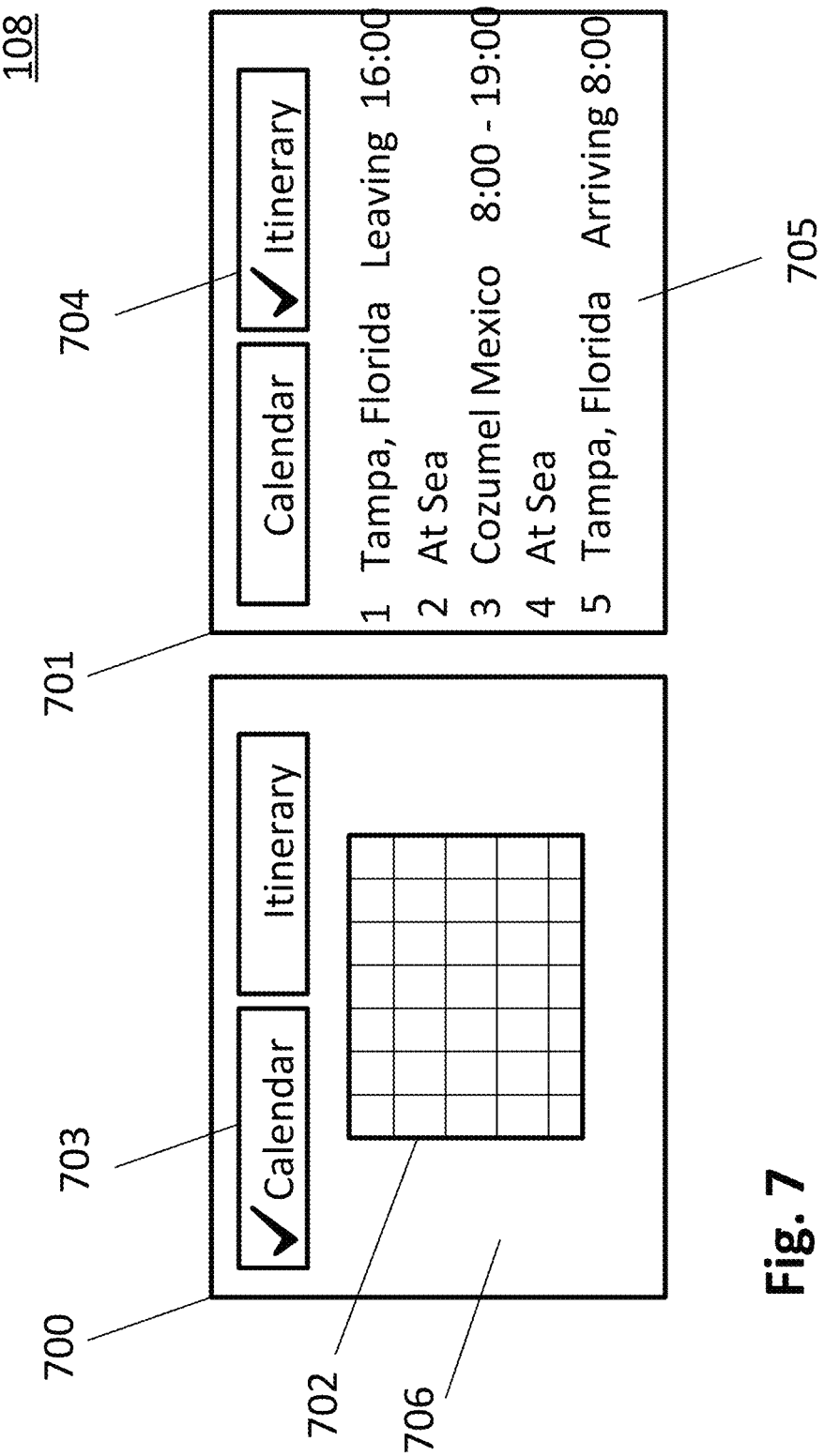
FIG. 7 illustrates an example of the cruise details area in a cruise search webpage according to some embodiments.

FIG. 7 illustrates a cruise details area (108) according to some embodiments. In some embodiments, clicking on a cruise result (106) selects this cruise and shows basic details in the cruise details area (108) and clicking on the selected cruise again deselects the cruise. The information in the details area (108) is able to be received from a server on which the user interface operates by using an Asynchronous JavaScript and XML (AJAX) technology, for example by initiating an XMLHttpRequest (XHR) and replacing an HTML (Hyper Text Markup Language) element with the received server response. These basic details (108) are able to comprise the itinerary of the cruise and the list of sailing dates with their appropriate prices corresponding to the chosen measure in the sorters area (102). As shown in FIG. 7, the cruise details area (108) is able to comprise a Calendar representation (700) and/or an Itinerary representation (701), which are able to be switched back and forth in some embodiments by clicking on a calendar button (703) or an itinerary button (704). The itinerary representation (701) displays the details (705) of the selected itinerary such as the visited port of call, arrival time, and departure time. It is understood that more or less details are able to be displayed as are well known in the art. The calendar (702) shown in the calendar representation (700) is able to be similar to the calendar (205) in the Cabin Selection page (98). Namely, each cell in the calendar (702) is able to either be displayed as "disabled" if the cruise does not sail on that date, or contain a price for that sailing date. The price is able to be the minimum across all types and/or categories, or an average, or a fully loaded price, or correspond to the selected sorter (102). Alternatively, other types of prices are able to be displayed as are well known in the art. The price is also able to be calculated for a specific category by selecting that category from a list box in the calendar area (706). If a cruise result (106) was selected, the cruise path (107) will be kept on the map (103) so that the user is able to use the map controls (109) to investigate the cruise. In some embodiments, the user is able to select multiple cruise results (106) to display multiple cruise paths (107) on the map, each in a different color. In some embodiments, the cruise details area (108) has a button that allows the user to proceed to the cabin selection webpage of the selected cruise (See FIG. 2).

Figure 8:
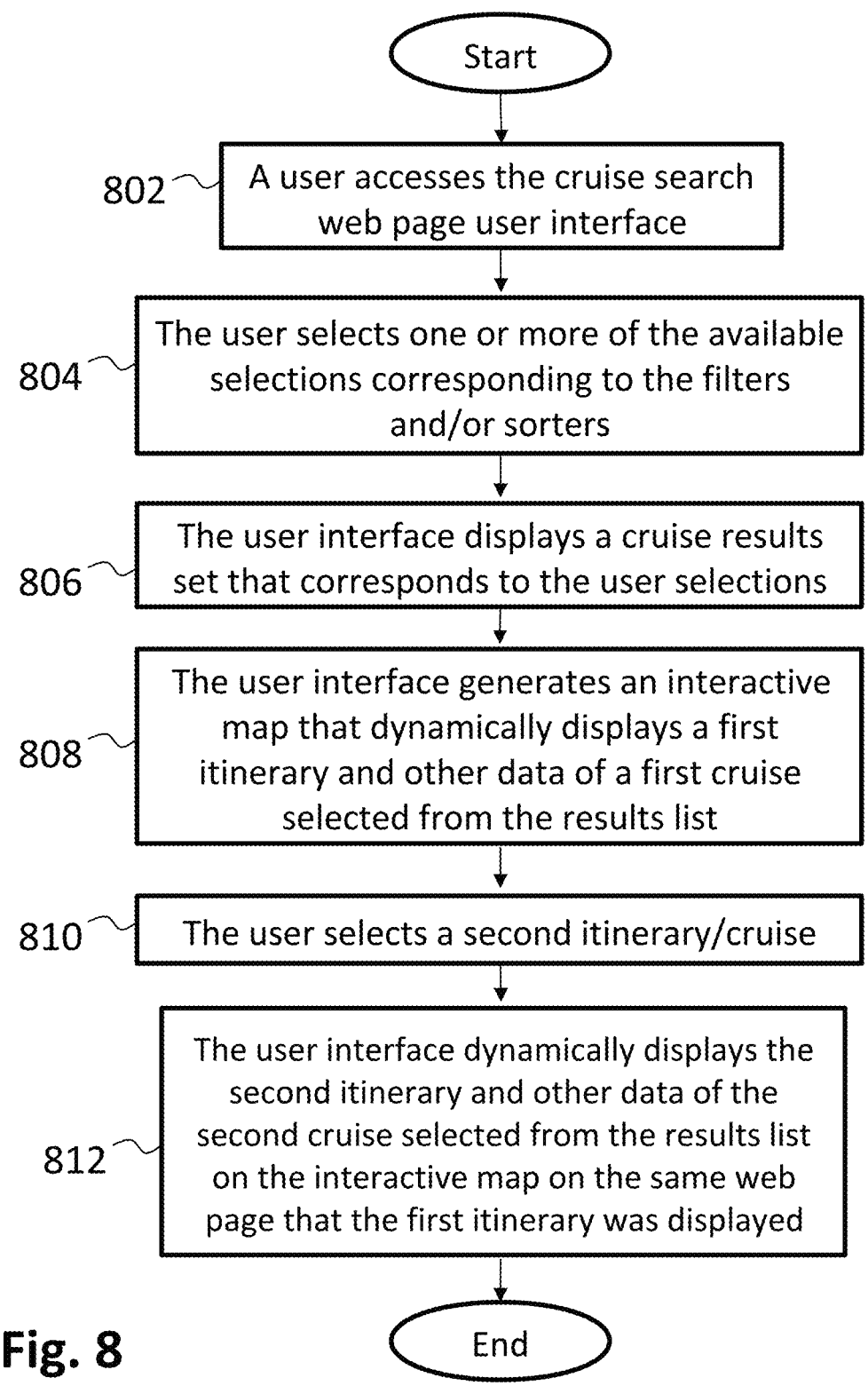
FIG. 8 illustrates a method of operating the user interface for the cruise search web page according to some embodiments.

The operation of the user interface for the cruise search web page (99) will now be discussed in conjunction with a flow chart shown in FIG. 8. A user accesses the cruise search web page user interface 99 at the step 802. The user selects one or more of the available selections corresponding to the filters (101) and/or the sorters (102) at the step 804. The user interface (99) displays a cruise results set (106) that corresponds to the user selections at the step 806. The user interface (99) generates an interactive map (103) that, in some embodiments, dynamically displays a first itinerary and other data of a first cruise selected from the results list at the step 808. Alternatively, the interactive map (103) statically displays the first itinerary and other data. In some embodiments, the user navigates the interactive map (103) using the map controls (109) in order to access itinerary data corresponding to the selected cruise. In some embodiments, the selecting of the cruises is done by the user clicking and/or hovering over one of the cruises in the cruise results set (106). The user selects a second itinerary of a second cruise at the step 810. The user interface 99 dynamically displays the second itinerary and other data of a second cruise selected from the results list on the interactive map (103) on the same web page that the first itinerary was displayed at the step 812. In some embodiments, the other data comprises cruise details (108) and/or port details (105).

As a result, the user interface 99 provides the benefits of enabling a user to compare the itineraries of the available cruises by dynamically displaying them on an interactive map (103) as each cruise is selected/highlighted. Further, a user is able to see and compare cruise itineraries that are displayed on a map as they spatially navigate the map using the map controls (109). This is in contrast with previous interfaces that only separately displayed cruise itinerary information on distinct web pages thereby requiring a user to navigate to each separate web page for the cruise selected and record information for each cruise individually in order to make a comparison of the cruises.

Cabin Selection

FIG. 2 illustrates the user interface for the cabin selection page (98) according to some embodiments. As shown in FIG. 2, the cabin selection page (98) comprises information on the selected itinerary (200). It also is able to comprise a deck plan (208) that displays each deck of the ship that will be sailing the selected itinerary. In some embodiments, the decks are able to be aligned and scaled by using the distance between the elevator shafts as a reference (the distance has to be the same on every deck). As shown in FIG. 2, the decks are displayed next to each other horizontally. Alternatively, the decks are able to be displayed horizontally, vertically, as a virtual 3-D plan (with each deck appearing to exist in a stack just like they do in a real ship) or a combination thereof. In some embodiments, the deck plan is able to display the entire ship, and are able to be magnified using the zoom tool (600, FIG. 6) in the filters and controls area (201). When a higher detailed level of zoom is used, the deck plan (208) is able to allow scrolling or panning to display different sections of the ship.

In some embodiments, each deck (202) comprises residential cabins of different categories and/or public areas ("facilities") such as gym, disco, dining room, and/or spa. Each cabin's background can be color-coded to indicate its type and category. For example, all cabins in the "Ocean View" type are able to be green, with more expensive rooms a vibrant chartreuse and less expensive rooms a more muted celadon. In some embodiments, categories are able to be differentiated by a pattern, hue, and/or brightness. Alternatively, they are able to be color-coded according to the cruise lines' color-coding or not color-coded at all. Clicking on a cabin or a public area opens an information bubble (203) displaying basic details on the selected element. For cabins, it is able to display information such as the cabin price for the selected sailing date on the calendar (204), the cabin number, items and services included, photos, cabin floor plan, cabin dimensions, window type, view obstruction, accessibility, sea sickness risk, and proximate public areas and their hours of operation on the same deck or in decks above/below the chosen cabin. Alternatively, other information relating to the selected cabin is able to be displayed by the cabin bubble (203) as are well known in the art. Alternatively, some or all of the basic details or other information is able to be displayed outside of the bubble (203). For example, the cabin prices are able to be displayed on other portions of the display outside the bubble (203). The information bubble (203) for cabins comprises a button that allows adding the cabin to the shopping cart. For public areas, the information bubble (203) is able to display information such as hours of operation, services provided, service prices, entertainment schedule, photos, and virtual tours. Cabins that are unavailable for the selected sailing date on the calendar (204) are able to be visually marked as unavailable, for example, by displaying an icon or applying a semi-opaque mask.

The calendar area (204) on FIG. 2 is able to show the available sailing dates to the user. Specifically, in some embodiments each cell in the calendar (205) is able to either be displayed as "disabled" if the cruise does not sail on that date, or contain a price for that sailing date. The price is able to be the minimum across all categories, or an average, or a fully loaded price. It is also able to be calculated for a specific category by selecting that category from a list box in the calendar area (204). Some embodiments allow passengers to restrict the search to a specific category by clicking directly on the words describing that category in the category/subcategory area (206). Clicking on a cell in the calendar (205) representing a valid sailing date is able to select that date. In some embodiments, there is always one sailing date selected on the cabin selection webpage. The cabin categories/subcategories area (206) shows a legend of all the ship's categories. In some embodiments, each category has a box (207) colored by the category's designated color which displays the category code and the category's price for the selected date on the calendar (204).

Hovering on a category box is able to visually mark that box (209) and all the cabins belonging to that category (210), on all relevant decks. Hovering on a cabin on one of the decks (202) is able to visually mark all the cabins belonging to the same category (210) and the related category box (209). The visual mark described is able to be any mark which can distinguish between marked and unmarked cabins. In some embodiments, the visual mark is a colored border or removal of semi-opaque mask which is applied to all cabins.

FIG. 6 illustrates the filters and controls area (201) of the cabin selection (98) of the user interface according to some embodiments. Specifically, as shown in FIG. 6, these filters and controls (201) are able to comprise a zoom control (600); connected cabins toggle button (601), which visually marks all cabins with connecting doors; maximum guests in cabin filter (602), which visually marks all cabins with capacity for the number of guests selected in the filter; and/or Cabin Finder button (603). It is understood that more or less filters and/or controls are able to be displayed as are well known in the art. Some embodiments are able to include one or more free text search boxes that allow filtering on one or more dimensions, in conjunction with other filters. The cabin finder button (603) is able to open a dialog box (604) enabling a targeted cabin search by various use cases. For example, the dialog box (604) and the cabin finder button (603) are able to enable finding two cabins of different categories on the same deck. The cabins matched are able to be visually marked all at once on the deck plans. Alternatively, each matched set of cabins are able to be highlighted in turn by implementing a control that enables moving between the next and previous matched sets.

An image is able to be kept for every deck in each zoom level. Deck images are able to be lazily-loaded by demand, by client request, cached in advance, by implementing a mix between these techniques, and/or in other implementation methods known in the art. In some embodiments, highlighting the hovered cabins comprises, on top of the images, a semi transparent mask that is able to be placed to create a grayed-out effect. A database table contains the polygonal coordinates of every cabin or public area ("facility") on every deck. This information is able to be rendered and sent to the client as HTML (Hyper Text Markup Language) elements (such as "div" elements) with their background set as the appropriate deck image and x-position and y-position set to match the cabin coordinates. These HTML elements are hidden, and displayed on top of the semi-transparent mask when needed to create the highlighting effect. Several embodiments are able to handle non rectangular cabins correctly. For example, the HTML elements mentioned above are able to be rendered containing many "div" elements, each representing a strip of a 1-pixel line and set with margins that effectively draw the cabin's shape. Alternatively, images for non-rectangular cabins are able to be sliced in advance, having the areas outside of the cabin transparent. Every HTML element mentioned above also is able to contain properties and information on the type and/or category that each cabin belongs to. Client side JavaScript code is able to use this information to know which related cabins to highlight. Every HTML element is also able to contain properties and information that are to be displayed in the information bubble (203). The client uses these HTML elements to visually mark the cabins which belong to a certain type and/or category or are in accordance with a search performed by the cabin finder button (603). The price information is able to be sent to the client per type and/or category for a relevant set of dates. The price information is able to be refreshed using Asynchronous JavaScript and XML (AJAX) technology, for example by initiating an XMLHttpRequest (XHR) and replacing an HTML (Hyper Text Markup Language) element with the received server response. In some embodiments, this behavior can be initiated upon traversal to a different calendar month in the calendar (204).

Alternatively, Javascript and Canvas technologies are able to be used to yield a similar result. In such embodiments, a database table contains the polygonal coordinates of every cabin or public area ("facility") on every deck, as well as properties and information on the category that each cabin belongs to. This information is able to be sent to the client as JSON (JavaScript Object Notation) or in another method known in the art. In addition, images are able to be sent to the client and displayed on the Canvas. The client renders the images and uses Canvas routines to draw outlines or color-filled cabin shapes above the images or below the images if parts of the images are transparent (such that it is able to display shapes drawn below them). The opacity of these shapes is able to be controlled to highlight hovered-on cabins.

Figure 9:
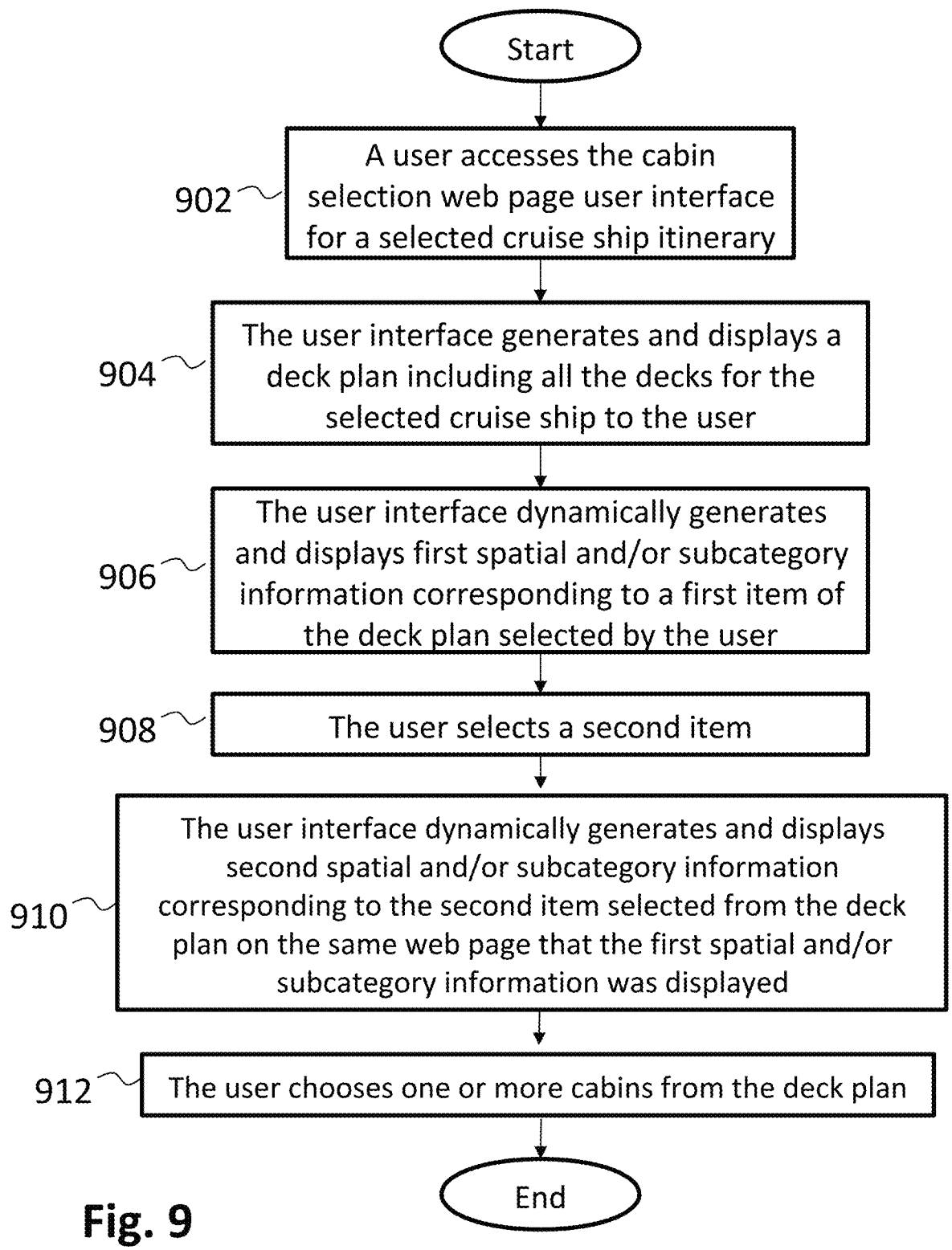
FIG. 9 illustrates a method of operating the user interface for the cabin selection web page according to some embodiments.

The operation of the user interface for the cabin selection web page (98) will now be discussed in conjunction with a flow chart shown in FIG. 9. A user accesses the cabin selection web page user interface (98) for a selected cruise ship itinerary at the step 902. In some embodiments, the itinerary (200) corresponds to the itinerary selected from the cruise selection web page (99) in the method described above in relation to FIG. 8. The user interface (98) generates and displays a deck plan (208) including all the decks for the selected itinerary to the user at the step 904. In some embodiments, the user is able to navigate the deck plan (208) using the filters and controls area (201). In some embodiments, the deck plan (208) as displayed is aligned and scaled such that the display accurately reflects spatial relationships found on the cruise ship between the cabins, decks and other portions displayed in the deck plan (208). In some embodiments, the deck plan (208) further comprises prices, cabin availabilities, cabin information and public area information. The user interface (98) dynamically generates and displays first spatial and/or category/subcategory and/or cabin and/or facility information corresponding to a first item of the deck plan (208) selected by the user at the step 906. In some embodiments, the selecting is by clicking on or hovering over a portion of the deck plan (208) by the user. The user selects a second item at the step 908. The user interface (98) dynamically generates and displays second spatial and/or category and/or cabin and/or facility information corresponding to the second item selected from the deck plan (208) on the same web page that the first spatial and/or category/subcategory and/or cabin and/or facility information was displayed at the step 910. In some embodiments, the spatial information is the spatial relationship between the selected items and other parts of the deck plan (208). In some embodiments, the category information is the visually marking of all cabins that correspond to the category of the selected item. In some embodiments, the selected items are cabins. In some embodiments, the selected items are facilities. In some embodiments, the selected items are calendar dates and/or cabin categories. The user chooses one or more cabins from the deck plan (208) at the step 912. It is understood that although described separately, the methods of FIGS. 8 and 9 are able to be combined into a single method for choosing a cruise itinerary and cabins for the chosen cruise itinerary.

As a result, the user interface provides the benefit of adding spatial dimension to cabin selection thereby enabling a user to view multiple decks simultaneously and/or stacked together when choosing one or more cabins for a cruise. Further, the user interface provides the benefit of allowing a user to select cabins of various types and/or categories by visually marking cabins from multiple types and/or categories simultaneously even if the cabins are on different decks and then presenting spatial information corresponding to the cabins. Moreover, the visual markings and spatial information is dynamically generated and presented for any of the deck plan items. Thus, the same web page is able to switch between the desired displays that correspond to different cabins on different decks and/or different types and/or categories. This is in contrast to prior cabin selection interfaces that only display single selected decks and that only display cabins from a single selected category of the selected deck at a time thereby forcing a user to navigate back to other categories on different web pages for different decks in order to compare cabins.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A non-transitory computer-readable medium storing a cruise line reservation user interface, the user interface comprising:
   a. a list of a plurality of cabin categories;
   b. an interactive deck map window displaying one or more interactive deck plans that illustrate one or more cabins on each deck,
wherein the list and the interactive deck map window are concurrently displayed to a user on a webpage when accessing the user interface, wherein only selected cabins belonging to all of two or more of the plurality of cabin categories are highlighted on the deck plans upon selection of the two or more cabin categories without navigating to another webpage, wherein each of the one or more interactive deck plans enable multi-zoom levels that enable the user to focus on an area of interest, wherein when the user selects a cabin on one of the deck plans, some or all of the other cabins displayed within the interactive deck map window are highlighted, wherein the cabins are rendered and sent as web browser-readable elements, further wherein the web browser-readable elements are hidden and displayed on top of a semi-transparent mask to generate a highlighting effect, further wherein images for non-rectangular cabins are sliced and cached in advance of displaying the interactive deck map, having areas outside the non-rectangular cabins transparent, wherein decks of the interactive deck map are displayed as a virtual three dimensional plan, wherein hovering over a port icon opens a port details bubble, wherein the port details bubble includes a button configured for filtering cruises that pass through a port, and hovering over a cruise result draws a polygon on a cruise path map; and c. a plurality of filters for filtering results of the one or more interactive deck plans for the interactive deck map window, wherein changing from a first filter of the plurality of filters to a second filter of the plurality of filters includes updating only a portion of the webpage using a client-side implementation to filter the results that were sent in advance and using a server-side implementation to request a refreshed set of data by receiving a set of filter values and building a result set that is sent to the client by performing a database query.

2. The medium of claim 1, wherein the user is able to select the two or more cabin categories by hovering over the cabin categories on the list with a selection icon.

3. The medium of claim 2, wherein two or more of the deck plans are displayed simultaneously to the user within the deck map window.

4. The medium of claim 3, wherein the simultaneously displayed deck plans are displayed three-dimensionally such that the deck plans are positioned on top of one another.

5. The medium of claim 4, wherein spatial relationship data associated with one of the cabins is displayed in the interactive deck map window when the user selects the associated cabin on one of the deck plans.

6. The medium of claim 1, wherein the user is able to select a cabin by hovering over the cabin in the interactive deck map window with a selection icon.

7. The medium of claim 6, wherein the spatial relationship data comprises text indicating distances and/or directions between the associated cabin and other cabins or public areas within the deck plans.

8. The medium of claim 7, further comprising a virtual shopping cart that is concurrently displayed with the interactive deck map window and list, wherein without navigating to another webpage the user is able to save one or more cabins within the virtual shopping cart by selecting and inserting the cabins into the virtual shopping cart on the webpage.

9. The medium of claim 8, wherein the user is able to filter the cabins by proximity such that only cabins with locations within a selected distance of a selected cabin are highlighted on the deck plans.

10. The medium of claim 9, wherein each of the deck plans show all the cabins located on that deck when displayed on the interactive deck map window.

11. A method of implementing a cruise line reservation user interface, the method comprising:

a. displaying to a user on a webpage a list of a plurality of cabin categories;
   b. displaying an interactive deck map window on the webpage with the list, wherein the window shows one or more interactive deck plans that illustrate one or more cabins on each deck, wherein the one or more interactive deck plans are aligned and scaled using a distance between reference points;
   c. upon selection of two or more cabin categories, only selectively highlighting on the deck plans cabins belonging to all of the two or more of the plurality of cabin categories without navigating to another webpage, wherein each of the one or more interactive deck plans enable multi-zoom levels that enable the user to focus on an area of interest;
   d. upon selection of a cabin on one of the deck plans, highlighting some or all of the other cabins displayed within the interactive deck map window, wherein a database table contains polygonal coordinates of the cabins which are rendered and sent as web browser-readable elements, wherein the web browser-readable elements are hidden and displayed on top of a semi-transparent mask to generate a highlighting effect, further wherein images for non-rectangular cabins are sliced and cached in advance of displaying the interactive deck map, having areas outside the non-rectangular cabins transparent, wherein decks of the interactive deck map are displayed as a virtual three dimensional plan, wherein hovering over a port icon opens a port details bubble, wherein the port details bubble includes a button configured for filtering cruises that pass through a port, and hovering over a cruise result draws a polygon on a cruise path map; and
   e. filtering results of the one or more interactive deck plans for the interactive deck map window using a plurality of filters, wherein changing from a first filter of the plurality of filters to a second filter of the plurality of filters includes updating only a portion of the webpage using a client-side implementation to filter the results that were sent in advance and using a server-side implementation to request a refreshed set of data by receiving a set of filter values and building a result set that is sent to the client by performing a database query.

12. The method of claim 11, further comprising selecting the two or more cabin categories by hovering over the cabin categories on the list with a selection icon.

13. The method of claim 12, further comprising simultaneously displaying two or more of the deck plans to the user within the deck map window.

14. The method of claim 13, wherein the simultaneously displayed deck plans are displayed three-dimensionally such that the deck plans are positioned on top of one another.

15. The method of claim 14, further comprising displaying spatial relationship data associated with one of the cabins in the interactive deck map window when the user selects the associated cabin on one of the deck plans.

16. The method of claim 11, further comprising selecting a cabin by hovering over the cabin on the interactive deck map window with a selection icon.

17. The method of claim 16, wherein the spatial relationship data comprises text indicating distances and/or directions between the associated cabin and other cabins or public areas within the deck plans.

18. The method of claim 17, further comprising concurrently displaying a virtual shopping cart with the interactive deck map window and list, wherein without navigating to another webpage the user is able to save one or more cabins within the virtual shopping cart by selecting and inserting the cabins into the virtual shopping cart on the webpage.

19. The method of claim 18, further comprising filtering the cabins by proximity such that only cabins with locations within a selected distance of a selected cabin are highlighted on the deck plans.

20. The method of claim 19, wherein each of the deck plans show all the cabins located on that deck when displayed on the interactive deck map window.

* * * * *